US010185707B2

(12) United States Patent
Fay et al.

(10) Patent No.: US 10,185,707 B2
(45) Date of Patent: Jan. 22, 2019

(54) AGGREGATE VISUALIZATIONS OF ACTIVITIES PERFORMED WITH RESPECT TO PORTIONS OF ELECTRONIC DOCUMENTS

(71) Applicant: Microsoft Technology Licensing, LLC, Redmond, WA (US)

(72) Inventors: Jonathan Edgar Fay, Woodinville, WA (US); Joshua Allen Cowhig, Redmond, WA (US); Christopher Lee Mullins, Sammamish, WA (US); Robert Earl Standefer, III, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 14/971,937

(22) Filed: Dec. 16, 2015

(65) Prior Publication Data

US 2017/0177556 A1    Jun. 22, 2017

(51) Int. Cl.
*G06F 17/24*     (2006.01)
*G06F 17/21*     (2006.01)
(Continued)

(52) U.S. Cl.
CPC .......... *G06F 17/241* (2013.01); *G06F 3/0484* (2013.01); *G06F 17/211* (2013.01); *G06F 17/22* (2013.01); *G06F 17/24* (2013.01)

(58) Field of Classification Search
CPC ..... G06F 17/241; G06F 17/211; G06F 17/218
See application file for complete search history.

(56) References Cited

U.S. PATENT DOCUMENTS

| 7,039,597 B1 | 5/2006 | Notani et al. |
| 7,299,257 B2 | 11/2007 | Boyer et al. |

(Continued)

FOREIGN PATENT DOCUMENTS

| EP | 2704445 A1 | 3/2014 |
| WO | 2006014727 A1 | 2/2006 |

(Continued)

OTHER PUBLICATIONS

Pawlowicz, Leszek, "Easy Heat Maps from Spreadsheet Data with OpenHeatMap," Retrieved on: Sep. 23, 2015 Available at: http://freegeographytools.com/2010/easy-heat-maps-from-spreadsheet-data-with-openheatmap.

(Continued)

*Primary Examiner* — Scott T Baderman
*Assistant Examiner* — Seung Jung
(74) *Attorney, Agent, or Firm* — Michael Best & Friedrich LLP

(57) ABSTRACT

A facility for annotating portions of a document shown in a visual representation of the document with annotations reflecting aggregated document activities performed with respect to the portions is described. The facility specifies a visual representation of at least part of the document. For each of at least two portions of the document that are not identical and that are represented in the specified visual representation, the facility attaches to locations in the document's visual representation corresponding to the portion a visual annotation reflecting an aggregation operation against document activities performed with respect to the portion.

16 Claims, 12 Drawing Sheets

(51) Int. Cl.
  *G06F 3/0484*   (2013.01)
  *G06F 17/22*   (2006.01)

(56) References Cited

U.S. PATENT DOCUMENTS

| | | | |
|---|---|---|---|
| 7,617,281 | B2 | 11/2009 | Manion et al. |
| 7,716,263 | B2 | 5/2010 | Masek |
| 8,615,713 | B2 | 12/2013 | Sun et al. |
| 8,682,973 | B2 | 3/2014 | Kikin-Gil et al. |
| 8,689,108 | B1 | 4/2014 | Duffield et al. |
| 2003/0167281 | A1 | 9/2003 | Cohen et al. |
| 2006/0026502 | A1 | 2/2006 | Dutta |
| 2007/0165904 | A1* | 7/2007 | Nudd ............... G06Q 20/20 382/100 |
| 2009/0249224 | A1 | 10/2009 | Davis et al. |
| 2010/0312793 | A1 | 12/2010 | Brown et al. |
| 2011/0029521 | A1 | 2/2011 | Thayne et al. |
| 2011/0072355 | A1 | 3/2011 | Carter et al. |
| 2011/0179066 | A1 | 7/2011 | Cardno et al. |
| 2012/0159315 | A1 | 6/2012 | Chakra et al. |
| 2012/0233150 | A1 | 9/2012 | Naim et al. |
| 2012/0311540 | A1* | 12/2012 | Fanning ............ G06F 11/3612 717/127 |
| 2013/0159922 | A1* | 6/2013 | Borkowski .......... G06F 3/0485 715/786 |
| 2013/0191451 | A1 | 7/2013 | Tse et al. |
| 2013/0205203 | A1* | 8/2013 | MacDougall .......... G06F 17/24 715/256 |
| 2013/0212250 | A1 | 8/2013 | Kleppner et al. |
| 2013/0262983 | A1 | 10/2013 | Richter et al. |
| 2013/0301953 | A1 | 11/2013 | Montague |
| 2014/0013242 | A1 | 1/2014 | Beresford-Wood et al. |
| 2014/0122991 | A1* | 5/2014 | Achillopoulos .... G06F 17/2785 715/230 |
| 2014/0257894 | A1 | 9/2014 | Melahn et al. |
| 2015/0082196 | A1 | 3/2015 | Berger et al. |
| 2015/0213631 | A1* | 7/2015 | Vander Broek ....... G06T 11/206 345/589 |
| 2015/0370769 | A1 | 12/2015 | Pereira Filho et al. |
| 2016/0344828 | A1* | 11/2016 | Hausler ............ G06F 17/30011 |
| 2016/0372079 | A1* | 12/2016 | Ku ........................ G09G 5/02 |

FOREIGN PATENT DOCUMENTS

| | | |
|---|---|---|
| WO | 2013085699 A1 | 6/2013 |
| WO | 2015036817 A1 | 3/2015 |

OTHER PUBLICATIONS

"Microsoft Motion," Retrieved on: Sep. 23, 2015 Available at: blogs.microsoft.co/il/files/folders/2034/download.aspx.

"How to Create an Interactive Heat Map in Excel," Retrieved on: Sep. 28, 2015 Available at: https://www.youtube.com/watch?v=L_VgdPZgpZY.

Latif, Lawrence, "Microsoft Brings Heat Maps to Windows 8 Task Manager," Published on: Oct. 14, 2011 Available at: http://www.theinquirer.net/inquirer/news/2117437/microsoft-brings-heat-maps-windows-task-manager.

"Heat Maps," Retrieved on: Sep. 28, 2015 Available at: http://tag.microsoft.com/what-is-tag/reporting-tools/heat-maps.aspx.

Brundritt, Ricky, "How to Create Heat Maps in Native Windows Store Apps," Published on: Mar. 11, 2014 Available at: http://blogs.msdn.com/b/bingdevcenter/archive/2014/03/11/heat-maps-in-windows-store-apps.aspx.

"Using Code Coverage to Determine How Much Code is Being Tested," Retrieved on: Oct. 14, 2015 Available at: https://msdn.microsoft.com/en-us/library/dd537628.aspx.

"International Search Report and Written Opinion Issued in PCT Application No. PCT/US2016/065474," dated Mar. 29, 2017, 10 Pages.

"Second Written Opinion Issued in PCT Application No. PCT/US2016/065474", dated Nov. 27, 2017, 5 Pages.

"International Preliminary Report on Patentability Issued in PCT Application No. PCT/US2016/065474", dated Mar. 13, 2018, 6 Pages.

"Chat User Manual", Retrieved From: https://support.cometchat.com/documentation/wp-content/uploads/sites/2/2013/03/End-user-manual-Premium-Edition.pdf, Sep. 22, 2016, 64 Pages.

"Collaborative Document Editing", Retrieved From: https://helpcenter.onlyoffice.com/onlyoffice-editors/onlyoffice-document-editor/helpfulhints/collaborativeediting.aspx, Apr. 7, 2016, 4 Pages.

"Doc Collaboration", Retrieved From: https://apihelp.wiki.zoho.com/Doc-Collaboration.html, Sep. 27, 2011, 4 Pages.

"Document Collaboration and Co-authoring", Retrieved From: https://support.office.com/en-us/article/Document-collaboration-and-co-authoring-ee1509b4-1f6e-401e-b04a-782d26f564a4, Aug. 8, 2016, 9 Pages.

"Overview of Co-authoring in SharePoint 2013", Retrieved From: https://technet.microsoft.com/en-IN/library/ff718249.aspx, Aug. 5, 2016, 7 Pages.

"Simultaneously Edit a Document with other Authors", Retrieved From: https://support.office.com/en-us/article/Simultaneously-edit-a-document-with-other-authors-2a6059e7-9fe9-4e66-8ecdf3d5372c27f4, Aug. 5, 2016, 7 Pages.

"Work Together on Office documents in OneDrive", Retrieved From: https://support.office.com/en-us/article/Work-together-on-Office-documents-in-OneDrive-ea3807bc-2b73-406f-a8c9-a493de18258b, Oct. 31, 2014, 5 Pages.

Carroll, et al., "Notification and Awareness: Synchronizing task-oriented collaborative activity", In International Journal of Human Computer Studies, vol. 58, No. 5, May, 2003, 26 Pages.

Hayashi, et al., "Activity Awareness: A Framework for Sharing Knowledge of People, Projects, and Places", In Proceedings of the Sixth European Conference on Computer-Supported Cooperative Work, Sep. 12, 1999, 20 Pages.

Hoffman, Chris, "How to Collaborate on Documents over the Internet", Retrieved From: http://www.howtogeek.com/183176/how-to-collaborate-on-documents-over-the-internet/, Feb. 23, 2014, 4 Pages.

Holzner, et al., "Google Docs 4 Everyone", In Publication of FT Press, Feb. 9, 2009, 2 Pages.

Laskaris, John, "Planning Collaboration Activities", Retrieved From: https://www.efrontlearning.com/blog/2015/11/planning-collaboration-activities.html, Nov. 2015, 10 Pages.

Moran, et al., "Document Presence Notification Services for Collaborative Writing", In Proceedings of the Seventh International Workshop on Groupware, Sep. 6, 2001, 9 Pages.

Papadopoulou, et al., "How a Structured Document Model Can Support Awareness in Collaborative Authoring", In Proceedings of the International Conference on Collaborative Computing: Networking, Applications and Worksharing, Nov. 12, 2007, 10 Pages.

"Invitation to Pay Additional Fee Issued in PCT Application No. PCT/US17/064388", dated Feb. 19, 2018, 5 Pages.

"International Search Report and Written Opinion Issued in PCT Application No. PCT/US2017/044999", dated Oct. 12, 2017, 14 Pages.

Reynolds, Michael, "How to Collaborate With Google Docs", Retrieved From: https://blog.spinweb.net/how-to-collaborate-with-google-docs, May 23, 2013, 21 Pages.

Sarin, et al., "A Process Model and System for Supporting Collaborative Work", In Proceedings of the ACM SIGOIS Bulletin, vol. 12, Issue 2-3, Nov. 1991, pp. 213-224.

\* cited by examiner

| user id | activity date | activity time | document id | document portion id | activity type | |
|---|---|---|---|---|---|---|
| | | | | | | ← 400 document activity table |
| 548923 | 11/2/2015 | 14:13:35.083 | 16721982 | 1 | read | ← 401 |
| 456412 | 11/2/2015 | 14:13:35.085 | 56465988 | 13 | author | ← 402 |
| ... | | | | | | |
| ↖411 | ↖412 | ↖413 | ↖414 | ↖415 | ↖416 | |

Select activity annotation details for Ingredient Sourcing Update:

activity period

- begin date: 11/10/2015 — 601, 602
- begin time: — 603
- end date: 11/16/2015 — 604
- end time:

aggregation type

- ☐ count — 631
- ☑ frequency — 632
- ☐ recency — 633 activities

- ☐ authoring — 611
- ☑ searching — 612
- ☐ reading — 613
- ☐ commenting — 614
- ☐ citation — 615
- ☐ incorporation — 616
- ☐ completion state — 617
- ☐ business impact level — 618
- ☐ sensitivity level — 619
- ☐ securing restrictions — 620
- ☐ security events — 621 actors — 641 type user or group name to add to list of actors whose activity is annotated

[ 642 ] [add] — 643

*FIG. 6*

Select activity annotation details for Ingredient Sourcing Update:

activity period
- begin date — 801
- begin time — 802
- end date — 803
- end time — 804 aggregation type
- ☐ count — 831
- ☐ frequency — 832
- ☑ recency — 833 activities
- ☑ authoring — 811
- ☐ searching — 812
- ☐ reading — 813
- ☐ commenting — 814
- ☐ citation — 815
- ☐ incorporation — 816
- ☐ completion state — 817
- ☐ business impact level — 818
- ☐ sensitivity level — 819
- ☐ securing restrictions — 820
- ☐ security events — 821 actors — 841 type user or group name to add to list of actors whose activity is annotated

[ ] — 842   [add] — 843

*FIG. 8*

Select activity annotation details for Ingredient Sourcing Update:

activity period — 1001
- begin date — 1002
- begin time — 1003
- end date — 1004
- end time activities
- ☐ authoring — 1011
- ☐ searching — 1012
- ☑ reading — 1013
- ☑ commenting — 1014
- ☐ citation — 1015
- ☐ incorporation — 1016
- ☐ completion state — 1017
- ☐ business impact level — 1018
- ☐ sensitivity level — 1019
- ☐ securing restrictions — 1020
- ☐ security events — 1021 aggregation type
- ☐ count — 1031
- ☑ frequency — 1032
- ☐ recency — 1033 actors — 1041 type user or group name to add to list of actors whose activity is annotated

[          ] [add]
  1042        1043

Select activity annotation details for Ingredient Sourcing Update:

activity period
- begin date ⬜ *— 1201*
- begin time ⬜ *— 1202*
- end date ⬜ *— 1203*
- end time ⬜ *— 1204* aggregation type
- ☐ count *— 1231*
- ☑ frequency *— 1232*
- ☐ recency *— 1233* activities
- ☐ authoring *— 1211*
- ☐ searching *— 1212*
- ☑ reading *— 1213*
- ☑ commenting *— 1214*
- ☐ citation *— 1215*
- ☐ incorporation *— 1216*
- ☐ completion state *— 1217*
- ☐ business impact level *— 1218*
- ☐ sensitivity level *— 1219*
- ☐ securing restrictions *— 1220*
- ☐ security events *— 1221* actors *— 1241* sales group
marketing group
safety group type user or group name to add to list of actors whose activity is annotated

[ _____ ] [add]
 *— 1242*       *— 1243*

*FIG. 12*

AGGREGATE VISUALIZATIONS OF ACTIVITIES PERFORMED WITH RESPECT TO PORTIONS OF ELECTRONIC DOCUMENTS

BACKGROUND

Electronic documents can contain content such as text, spreadsheets, diagrams, and images. Electronic documents can be the subject of a variety of activities, many of them performed by multiple people. These can include, for example: authoring/editing a document, viewing/reading a document, commenting on portions of a document, citing to portions of a document or incorporating them in other documents, etc.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for annotating portions of a document shown in a visual representation of the document with annotations reflecting aggregated document activities performed with respect to the portions is described. In some embodiments, the facility specifies a visual representation of at least part of the document. For each of at least two portions of the document that are not identical and that are represented in the specified visual representation, the facility attaches to locations in the document's visual representation corresponding to the portion a visual annotation reflecting an aggregation operation against document activities performed with respect to the portion.

BRIEF DESCRIPTION OF THE DRAWINGS

FIG. 6 is a display diagram showing a sample display presented by the facility in some embodiments to permit a user to select aspects of annotation to be performed by the facility, and its use to specify aspects of first annotations of a sample document.

FIG. 8 is a display diagram showing a sample display presented by the facility in some embodiments to permit a user to select aspects of annotation to be performed by the facility, and its use to specify aspects of second annotations of a sample document.

FIG. 10 is a display diagram showing a sample display presented by the facility in some embodiments to permit a user to select aspects of annotation to be performed by the facility, and its use to specify aspects of third annotations of a sample document.

FIG. 12 is a display diagram showing a sample display presented by the facility in some embodiments to permit a user to select aspects of annotation to be performed by the facility, and its use to specify aspects of fourth annotations of a sample document

DETAILED DESCRIPTION

Figure 1:
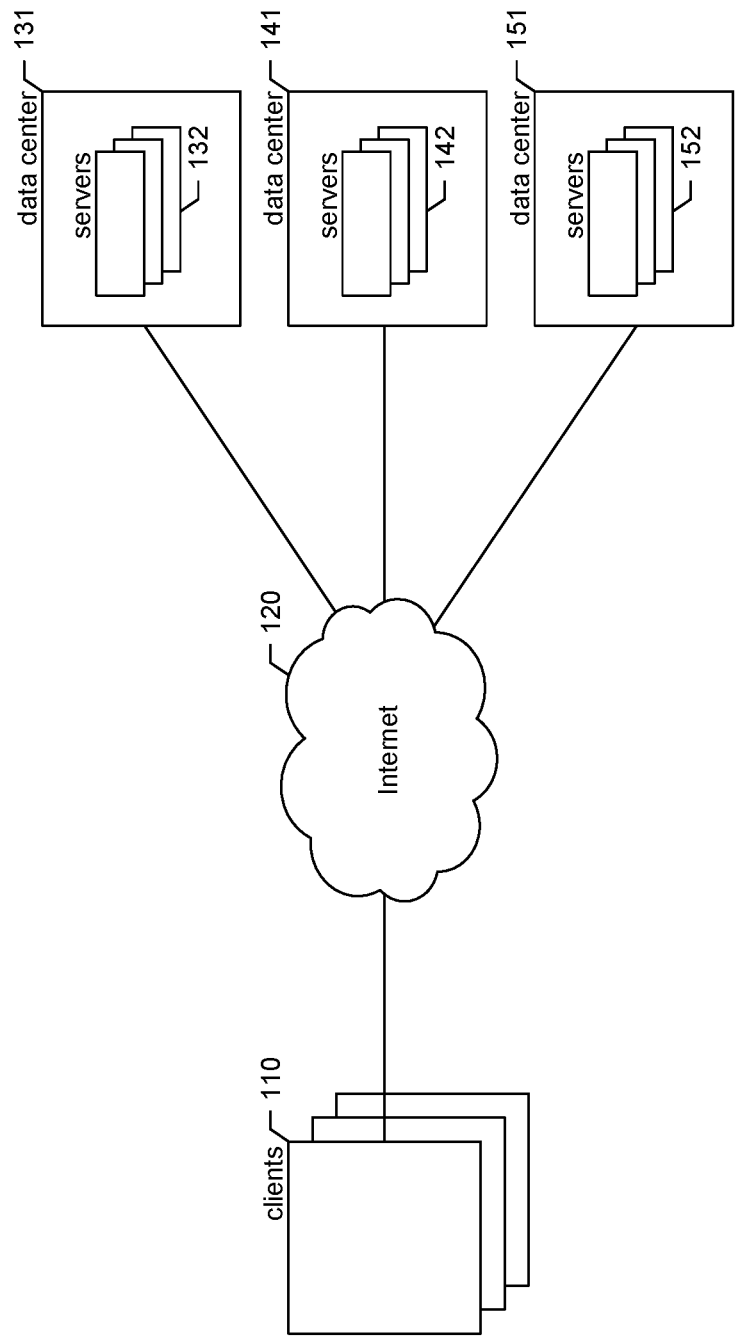
FIG. 1 is a network diagram showing the environment in which the facility operates in some embodiments.

The inventors have observed that conventional approaches to visualizing activity performed with respect to a document are extremely limited. For example, some word processing applications allow their users to display revisions made to a document since the document's creation—or since some other predetermined point in time—by showing inserted characters in underlined format, and by showing deleted characters in strike-through format.

The inventors have recognized that more effective approaches to visualizing a wide variety of types of activity performed with respect to a document would have significant utility. Accordingly, they have conceived and reduced to practice a software and/or hardware facility for generating flexible, powerful aggregate visualizations of activities performed with respect to portions of electronic documents ("the facility").

In various embodiments, the facility generates visualizations that add to a visual representation of a document annotations reflecting certain kinds of aggregated activity by some or all users with respect to portions of the document.

In various embodiments, the annotations added by the facility relate to a variety of activities performed with respect to positions in the document, including, for example, authoring and/or editing, being surfaced in a search query, viewing and/or reading, commenting and/or discussing, citation, incorporating content in other documents, setting of a completion state, setting of a business impact level, setting of a sensitivity level, setting of security restrictions, occurrence of security events, etc.

In some embodiments, the activities reflected in annotations added by the facility are limited by one or more dates and times, such as to those activities performed after a starting date and time, and/or those performed before an ending date and time. In various embodiments, the annotations added by the facility are products of various forms of aggregation. For example, in some embodiments, annotations are added by the facility that reflect the total number of actions taken with respect to different positions in the document during the effective time period—i.e., a count aggregation; in some embodiments, annotations reflect the frequency with which actions are taken during the effective time period; in some embodiments, annotations reflect the recency with which actions have been taken during the effective time period; etc.

In some embodiments, the annotations added by the facility relate to particular people and/or groups of people. For example, in some embodiments, the annotations added can be limited to activities performed by a particular person, or by people in a particular group of people; in some embodiments, the annotations added separately reflect activities performed by different people, or by people in different groups of people.

In various embodiments, the facility uses various kinds of representations of the document, including, for example, a copy of the document containing the document's full contents and mirroring the document's formatting; a copy of the document containing the document's full contents but being formatted differently from the document, such as to accommodate the annotations added by the facility; an outline of the document; a summary of the document; a skeleton of the document; etc.

In various embodiments, annotations added to the document representation characterize activities visually, such as representing different degrees of activities with different colors, patterns, or the dimensions or areas of displayed shapes; representing different kinds of activities with different colors or patterns; representing the activities of different people or groups of people with different colors or patterns; showing activity versus time graphs ("spark lines"); showing numerical values; etc.

In various embodiments, the facility adds annotations to the document representation in various positions, including, for example, in the document representation's margin; in a scrollbar for scrolling the document representation; in a pop-up window triggered by user interactions such as hovering a mouse cursor or directing a human gaze; within the content of the document representation; etc.

In various embodiments, these indications take various forms, including, for example, painting segments of the height of the scrollbar with different colors or patterns relating to activities performed with respect to corresponding positions within the representation; directly painting the content of the document representation with different colors or patterns relating to activities performed with respect to that content; adding to the margin shapes whose presence, colors, patterns, dimensions, or areas relate to the content beside them, or columns of such shapes that each correspond to a different activity, person or group of people, aggregation type; etc.

In various embodiments, the facility adds the annotations at various levels of granularity, including, for example, for each character, word, line, paragraph, document section, separately-stored document fragment, or arbitrary document span. In some embodiments, the facility automatically shifts between different granularities based upon factors such as the size of the document, the area in which the document representation is being displayed, the zoom level at which the document representation is being displayed, the scroll position of the document representation's display, etc.

In various embodiments, the facility provides various user interfaces enabling the user to select aspects of the annotations added by the facility. In some embodiments, the facility automatically selects aspects of the annotations added by the facility based upon a variety of factors.

By performing in some or all of the ways described above, the facility provides a flexible, rich tool for exploring actions taken within a document, enabling its users in many cases to better understand and/or usefully revise, reorganize, recommend, promote, etc., the document.

In some embodiments, the facility annotates representations of documents stored using a construct called a "document fragment," or simply "fragment," which is a unit of document content stored separately by the facility, and easily shared between multiple documents. The document is comprised of a single "root fragment," which can directly contain content, as well as containing fragment references referring to other fragments. Those fragments referred to by the root fragment can themselves directly contain content and fragment references to other fragments, and so on. When a document is opened, the facility typically collects and synthesizes its contents by retrieving the root fragment, retrieving other fragments referred to by fragment references in the root fragment, retrieving further fragments referred to by fragment references in those fragments, and so on. In some embodiments, any fragment can be treated as a document, in the sense that it can be opened by an editing or presentation application as the root fragment. In some such embodiments, the facility annotates representations of these documents at the fragment level.

In some embodiments, the facility stores the fragments making up users' documents in a cloud-based service, where they can be accessed from virtually any location. In some embodiments, this cloud-based service uses a technique called "erasure coding" in which it decomposes, or "shreds," a fragment defined by a document author into multiple smaller constituent pieces, or "shreds," each of which the facility stores on multiple storage devices in different data centers in different geographic locations to provide disaster and outage survivability. When the cloud-based service receives a request for a fragment, it retrieves and combines these shreds to reconstitute the fragment.

In some embodiments, the facility stores a new version of a fragment to reflect each editing action performed on the fragment, each identified by the date and time at which the editing action was performed. For example, in some embodiments, the facility creates a new fragment version for each character or group of characters that is inserted in the fragment—such as by a keystroke or a text block paste—and for each character or group of characters that is deleted—such as by a backspace keypress or a select-and-delete operation. In some embodiments, each fragment version identifies the author that took the editing action reflected by the fragment version. In some embodiments, after being written, these fragment versions cannot be altered, and are said to be "immutable."

In some embodiments, over time, the facility deletes some of the versions of a fragment, so as to collapse two or more editing actions into an undeleted version of the fragment. In some embodiments, in doing so, the facility deletes only contiguous fragment versions all reflecting editing actions by the same author and immediately preceding an undeleted fragment version also reflecting an editing action by the same author.

In some embodiments, where the content is incorporated from a fragment-aware source document, the facility ensures that the incorporated content corresponds precisely to one or more whole fragments; that is, where the selected content spans only a portion of a fragment in the source document, the facility breaks that fragment in the source document into two fragments, a first that contains only the content from the original fragment that was selected, a second containing the content from the original fragment that was not selected, so that the first can be incorporated into the target document while the second is not. Where the content is incorporated from a fragment-unaware source document, the facility creates a new fragment to contain the incorporated content.

In response to the incorporation operation, the facility creates a fragment reference in the target document at the position in the target document where the content was incorporated to represent the incorporated content in the target document. In some embodiments, the fragment reference contains multiple components, such as a current fragment ID component and/or an original component. The current fragment ID component of the created fragment reference identifies the fragment to which the reference refers, such as by containing a fragment ID for this fragment that can be used to retrieve this fragment. The origin component, where used by the facility, maintains in the fragment reference state the fragment ID of the fragment in which the incorporated content originated, which can serve as a basis for changing the mode in which the incorporated content is used in the target document throughout the life of the fragment reference, and for tracking the provenance of the fragment. In some embodiments, the facility stores an ordered list of fragment IDs in the origin component to reflect the series of fragments from which the referenced fragment has been forked.

In various embodiments, at the time the user performs the incorporation operation, the user can specify an initial mode for the incorporated content in the target document by, for example, holding down a certain keyboard key during the drag interaction, using a varying control key combination to paste the incorporated content into the target document, responding to a context menu or dialog displayed by the facility in response to the incorporation operation, etc. In some embodiments, each mode has two characteristics: (1) whether the contents of the fragment are editable in the context of the incorporating document or fragment ("editable in context") and (2) how a version of the referenced fragment is chosen for inclusion in the incorporating document or fragment ("version selection"). In some embodiments, the following kinds of version selection options are available: (a) "latest"—the version of the fragment with the most recent time is incorporated by the reference; (b) "time-specified"—a particular version of the fragment associated with a particular time is incorporated by the reference (e.g., in some embodiments, an arbitrarily specified time causes selection of the fragment version whose time is the latest among the fragments that are not later than the specified time); (c) "special"—special rules are used to specify which version of the fragment is selected for incorporation. Examples of special rules are the latest document approved by a qualified approval authority, or the earliest version embodying an edit by a particular author.

In various embodiments, the facility supports some or all of the following incorporation modes: live mode, follow mode, forkable mode, pinned mode, special forkable mode, and special follow mode.

Live mode (1) is editable in context and (2) uses "latest" version selection. Thus, in live mode, an author can change the content of the fragment, which results in a new version of the fragment being created to reflect each such change. These changes will appear in any other containing fragments that incorporate the same fragment, and whose version selection option ends up selecting this version, either (a) latest, or (b) special with a selection rule that selects this version. Live mode is typically used for a reference included to both revise the referenced fragment, and reflect the revisions of others. By virtue of using the latest version selection option, a reference in live mode incorporates the latest version of the fragment, no matter its content or which authors' revision it reflects. Where live mode is selected, the facility populates a current fragment ID component of the fragment reference with the same fragment ID as the origin component. The current component of the fragment reference identifies the fragment whose contents are to be retrieved for inclusion in the target document.

Follow mode (1) is not editable in context, and (2) uses latest version selection. In follow mode, the latest version of the fragment is always incorporated, but can't be edited in the context of the document or fragment containing the follow mode reference. Follow mode is typically used for incorporated dynamic content maintained by one or more other authors, in a centralized manner.

Forkable mode (1) is editable in context, and (2) uses time-specified version selection. In forkable mode, the fragment can be edited in the context of the reference from the fragment's state at the specified time. Performing such an edit transforms the reference from forkable mode to live mode; reflects the edit in the first version of a new fragment ID; stores the new fragment ID in the context of the reference; and stores the original fragment ID in the reference's origin component. Forkable mode is typically used where a particular state of a fragment is to be the basis for a new set of edits that won't affect documents or fragments incorporating the original fragment. Similarly, the forkable and resulting live reference aren't affected by edits to the original fragment subsequent to the forkable reference version selection time.

Pinned mode (1) is not editable in context, and (2) uses time-specified version selection. While the fragment reference is in pinned mode, the version of the content incorporated in the referring document cannot be changed, either by a user editing the document or fragment containing the pinned reference (because not editable in context precludes editing by such an author), or by a user editing the fragment in the context of a different containing document or fragment (because such edits will be reflected in a new version of the fragment, which will not be selected by the time-specified selection logic of this reference). Where pinned mode is selected, the facility populates the current component of the fragment reference with the fragment ID of the origin fragment. Pinned mode is typically used to preserve a particular state of the fragment in the referring document.

Special forkable mode (1) is editable in context, and (2) specifies a special version selection rule. The incorporated fragment will, at any given time, show the content of the version of the source fragment that is selected by the special version selection rule at the time. When an author edits the fragment in context, the forking process described above occurs. Special forkable mode can be used, for example, to use an evolving template whose edits are subject to periodic approval as a basis for creating instances of new content.

Special follow mode (1) is not editable in context, and (2) specifies a special version selection rule. Thus, a special follow reference shows the version of the fragment that satisfies the version selection rule at any given time, which is not editable in context. This mode can be used, for example, to pull into a document or fragment centrally-authored content that is periodically rereleased by its authors to reflect all edits occurring since the last release.

A user may at any subsequent time change the mode of the incorporated content via various user interface techniques, such as by right-clicking on the incorporated content and selecting an item from a resulting context menu, selecting incorporated content and choosing a menu-bar menu item, interacting with a specialized control that is displayed when the mouse cursor hovers over the incorporated content, etc. In some embodiments, the facility incorporates or interoperates with a system of authority and access controls and other content governance measures limit the actions that can be taken by a particular user with respect to a particular document or fragment in various circumstances, including changing the mode of an existing fragment reference.

FIG. 1 is a network diagram showing the environment in which the facility operates in some embodiments. The network diagram shows clients 110 each being used by a different user. Each of the clients executes software enabling its user to create, revise, and present electronic documents. Software on the client also enables the client to retrieve and synthesize remotely-stored document contents, including document fragments. In particular, the Internet 120 or one or more other networks connect each of the clients to a number of different data centers, e.g., data centers 131, 141, and 151, which in some embodiments are distributed geographically to provide disaster and outage survivability, both in terms of data integrity and in terms of continuous availability. Distributing the data centers geographically also helps to minimize communications latency with clients in various geographic locations. Each of the data centers contain servers, e.g. servers 132, 142, and 152. The servers access storage devices containing document contents, including document fragments, and execute software for responding to requests from clients and other servers to store and retrieve document contents, again including document fragments. In various embodiments, the facility uses various different distributions of responsibility for retrieving and combining document fragments between the clients and the servers.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, personal digital assistants, televisions, cameras, etc.

Figure 2:
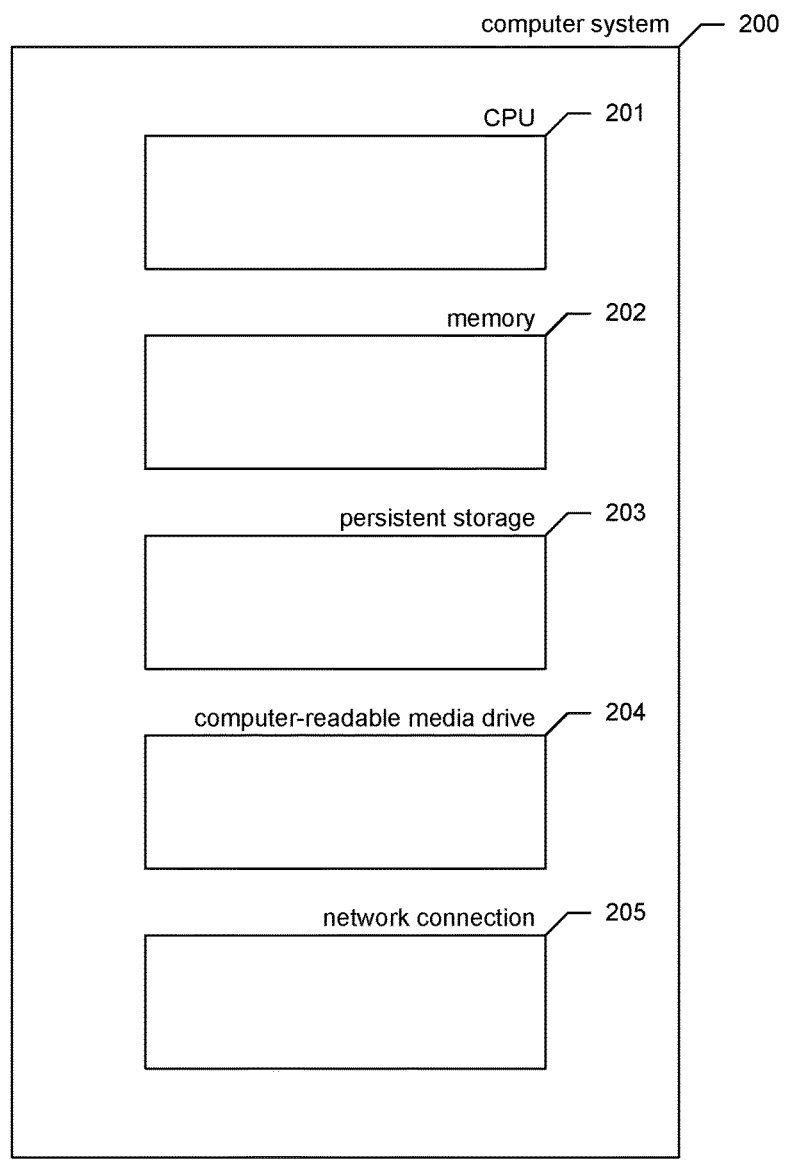
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figures 3, 4:
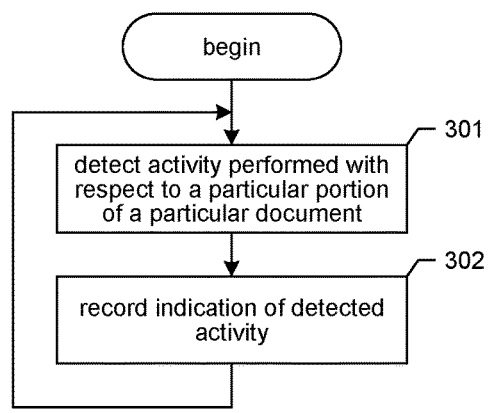
FIG. 3 is a flow diagram showing acts performed by the facility in some embodiments to record activity performed with respect to particular portions of electronic documents.
FIG. 4 is a table diagram showing sample contents of a document activity table used by the facility in some embodiments to store indications of detected activity each with respect to a portion of the document.

FIG. 3 is a flow diagram showing acts performed by the facility in some embodiments to record activity performed with respect to particular portions of electronic documents. In act 301, the facility detects activity performed with respect to a particular portion of a particular document. In various embodiments, this detection is performed for activities of various types, including authoring and/or editing, being surfaced in a search query, viewing and/or reading, commenting and/or discussing, citation, incorporating content into other documents, setting a completion state, setting a business impact level, setting a sensitivity level, setting security restrictions, and occurrence of security events. In various embodiments, the facility detects activities performed using a wide variety of applications and other mechanisms, including document editing applications, document readers, document presentation applications, document discussion applications, document security applications, search mechanisms, etc. In various embodiments, the facility performs the detection in various ways: as part of native functionality of the application or other mechanism used to perform the activity; as an add-on to the application or other mechanism used to perform the activity that uses a documented programmatic interface of the application or other mechanism; as a program that hooks or intercepts inter-program communication that relates to the performance of activities; as a program that monitors a client computer's video output, and interprets details in that video output as the performance of activities; etc. In act 302, the facility records an indication of the detected activity that includes details relevant to the detected activity. In some embodiments, act 302 involves storing a row in a document activity table or other similar persistent repository, an example of which is shown in FIG. 4 discussed below Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 4 is a table diagram showing sample contents of a document activity table used by the facility in some embodiments to store indications of detected activity each with respect to a portion of the document. The table is made up of rows, such as rows 401 and 402, each corresponding to a single activity performed with respect to a portion of a document. Each row is divided into the following columns: a user identifier column 411 containing an identifier identifying the user who performed the activity; an activity date column 412 specifying a date on which the activity was performed; an activity time column 413 specifying a time at which the activity was performed; a document identifier column 414 containing an identifier identifying the document with respect to which the activity was performed; a document portion identifier column 415 containing an identifier identifying a portion of a document with respect to which the activity was performed; and an activity type column 416 specifying the type of activity performed. In various embodiments, the facility uses as the document portion identifier a fragment identifier, a section number, a paragraph number, a node of a document graph representing the document, a node of a document outline, a span of the character positions of the document, coordinates or other information defining a spatial region in the document, etc. For example, row 401 indicates that, at 2:13:35.083 p.m. on Nov. 2, 2015, a user having user identifier 548923 performed a read activity with respect to portion one of the document having document identifier 16721982.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

In some embodiments (not shown) instead of or in addition to recording individual indications of activities as depicted in FIGS. 3 and 4, in response to detecting performance of activities, the facility updates a number of aggregations in which the performed activity should be included. For example, in response to an editing activity by a particular user in a particular portion in a particular document, the facility may increment a count of editing activities performed by that user in that document portion by anyone, increment account of editing activities performed in that document portion by users in a group of users that includes the user, increment account of editing activities performed in that document portion by the user, etc. These counts may in turn be used by the facility as a basis for annotating a representation of the document.

In some embodiments (not shown), instead of or in addition to the processing depicted in FIGS. 3 and 4 to store special-purpose indications of activities performed with respect to documents, the facility includes activity information needed to annotate document representations among data stored as part of substantively performing the activity. For example, instead of or in addition to storing row 402 in the document activity table 400 in FIG. 4 when the corresponding authoring action is performed, the facility may store equivalent information about the authoring activity in data structures representing the revised content of the document and/or fragments constituting the document.

Figure 5:
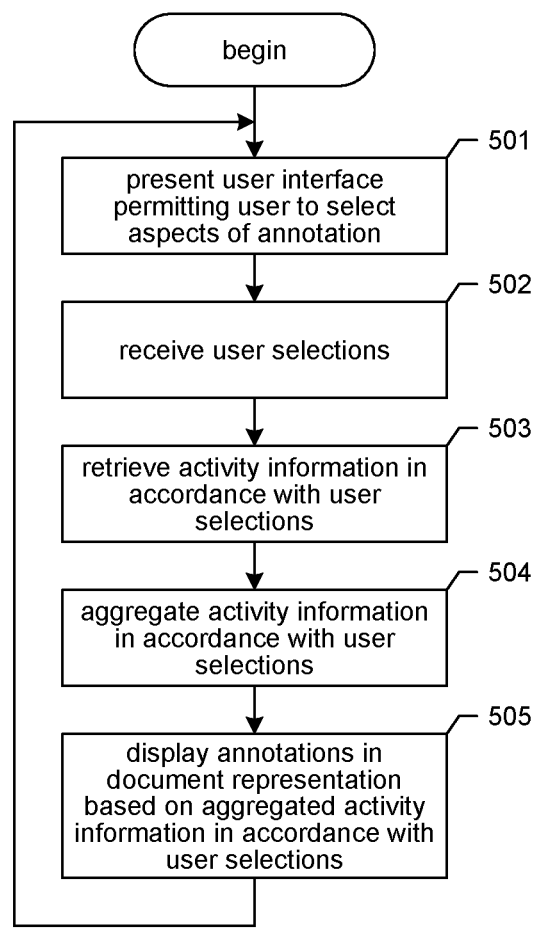
FIG. 5 is a flow diagram showing acts performed by the facility in some embodiments to annotate a document representation to reflect activity performed with respect to a corresponding document.

FIG. 5 is a flow diagram showing acts performed by the facility in some embodiments to annotate a document representation to reflect activity performed with respect to a corresponding document. In act 501, the facility presents a user interface permitting the user to select aspects of the annotation performed by the facility. In some embodiments, the facility presents this user interface in the context of displaying the document whose representation is to be annotated in any appropriate application. In some embodiments, this user interface enables the user to choose one or more of document identity, document version, the time period in which activities are two of occurred to be reflected in annotations, the activity types to be annotated, the former forms of aggregation to be used, the people are group of people whose activities are to be this subject of the annotations, etc. In various embodiments, the facility provides various kinds of user interfaces for this purpose; for example, in various embodiments, the facility displays a special-purpose window or pane in which the user can perform this selection; the facility displays visual information enabling this selection in the window in which the document or its representation is being displayed; the facility receives command keystrokes, spoken commands, context menu selections, handwriting gestures, or gestures of other kinds representing this selection without any affirmative prompting. Examples of user interfaces presented by the facility in some embodiments are shown in FIGS. 6, 8, 10, and 12 discussed below.

In act 502, the facility receives user selections via the user interface presented in act 501 or via associated interfaces. In act 503, the facility retrieves activity information useful to generate the annotations specified by the user selections received in act 502. For example, in some embodiments, where the received user selections specify annotations relating to the authoring of the document having document ID 56465988 between Nov. 1, 2015 and Nov. 30, 2015, the facility would retrieve rows of the document activity table including row 401.

In act 504, the facility aggregates the activity information retrieved in step 503 to provide a basis for the specified annotations. For example, where the received user selections specify a frequency aggregation function, the facility sums the number of qualifying activities performed with respect to each portion of the document, then divides each sum by the length of the relevant time period, such as a time period specified by the user.

In act 505, the facility displays annotations in the document representation that are based on the aggregation results produced in act 504. Examples showing the display of such annotations by the facility in some embodiments are shown in FIGS. 7, 9, 11, and 13 discussed below. After act 505, if the user seeks to adjust the selections received in act 502, the facility continues in step 501 to again present the user interface, the amount of time for which the document has existed, etc.

FIG. 6 is a display diagram showing a sample display presented by the facility in some embodiments to permit a user to select aspects of annotation to be performed by the facility, and its use to specify aspects of first annotations of a sample document. The display 600 includes fields 601-604 into which the user may enter dates and times bounding the time period for which annotations are to be generated; controls 611-621 that the user may use to select one or more activity types that are to be the subject of the annotations; controls 631-633 that the user may use to select at least one aggregation type to be reflected in the annotations; and controls 641-643 that the user may use to specify people and/or groups of people whose activities are to be reflected in the annotations. It can be seen that, for these first annotations of the sample document, the user has entered the date Nov. 10, 2015 into the begin date field 601, and has entered the date Nov. 16, 2015 into the end date field 603; that the user has operated control 612 to select the searching activity; and that the user has operated control 632 to select the frequency aggregation type.

Figure 7:
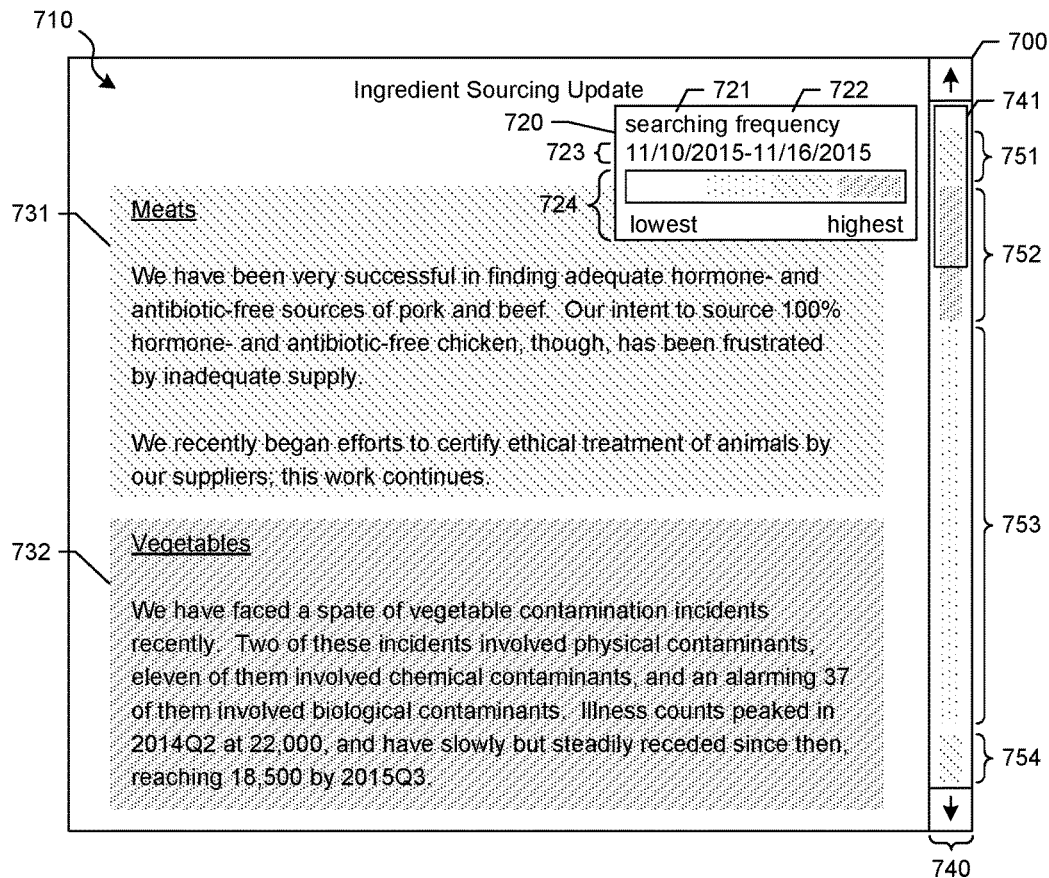
FIG. 7 is a display diagram showing a sample display presented by the facility in some embodiments including first annotations of a sample document in accordance with the user selections shown in FIG. 6.

FIG. 7 is a display diagram showing a sample display presented by the facility in some embodiments including first annotations of a sample document in accordance with the user selections shown in FIG. 6. The display 700 includes a visual representation 710 of the document. The display also includes an annotation legend 720 including details of the annotations, including the activity type 721 that is annotated (searching), the aggregation type 722 that is applied (frequency), the time range 723 for which annotations are generated (Nov. 10, 2015 through Nov. 16, 2015), and a key 724 to the visual characterizations of degree reflected by the annotations. In key 724, it can be seen that the visual characterizations of degree are visual patterns that increase in density as degree becomes higher. In various embodiments, the facility uses various other kinds of visual characterizations, including colors, shades, frequencies of flashing, etc.

FIG. 7 shows annotations of the document representation applied by the facility at the document section granularity level. In various embodiments, the facility applies annotations at a variety of granularity levels, including, for example, each character, word, line, paragraph, document section, separately-stored document fragment, or arbitrary document span. In contrast to FIG. 7, FIGS. 9, 11, and 13 discussed below show annotations applied by the facility at the paragraph granularity level.

In particular, the facility has attached an in-content annotation 731 to the "Meats" section of the document that, according to the legend 720, reflects that, during the specified time period, this section of the document was surfaced in searches at an intermediate frequency. The facility has also attached an in-content annotation 732 to the "Vegetables" section of the document that reflects that, during the specified time period, the section of the document was surfaced in searches at a high frequency. While FIG. 7 shows application of the pattern visual characterization to the background of the text in the sections of the document, in various embodiments, the facility applies visual characterizations in a variety of ways, including to the entire body of the text's characters, to an outline of the text's characters, to the fill regions of the text's characters, as a partial or complete border surrounding the text, etc.

The facility has also included in scrollbar 740 corresponding annotations for the entire length of the document. In particular, in the scrollbar, one can see an annotation 751 corresponding to an annotation 731 of the "Meats" section; an annotation 752 corresponding to annotation 732 of the "Vegetables" section which extends below the elevator portion 741 of the scrollbar that corresponds to the presently-displayed page of the document representation; as well as two additional scrollbar annotation 753 and 754 that correspond to in-content annotations that would be visible if the user scrolled down in the document representation to display the annotated sections.

FIG. 8 is a display diagram showing a sample display presented by the facility in some embodiments to permit a user to select aspects of annotation to be performed by the facility, and its use to specify aspects of second annotations of a sample document. It can be seen that, for these second annotations of the sample document, in display 800, the user has operated control 811 to select the authoring activity; and that the user has operated control 833 to select the recency aggregation type.

Figure 9:
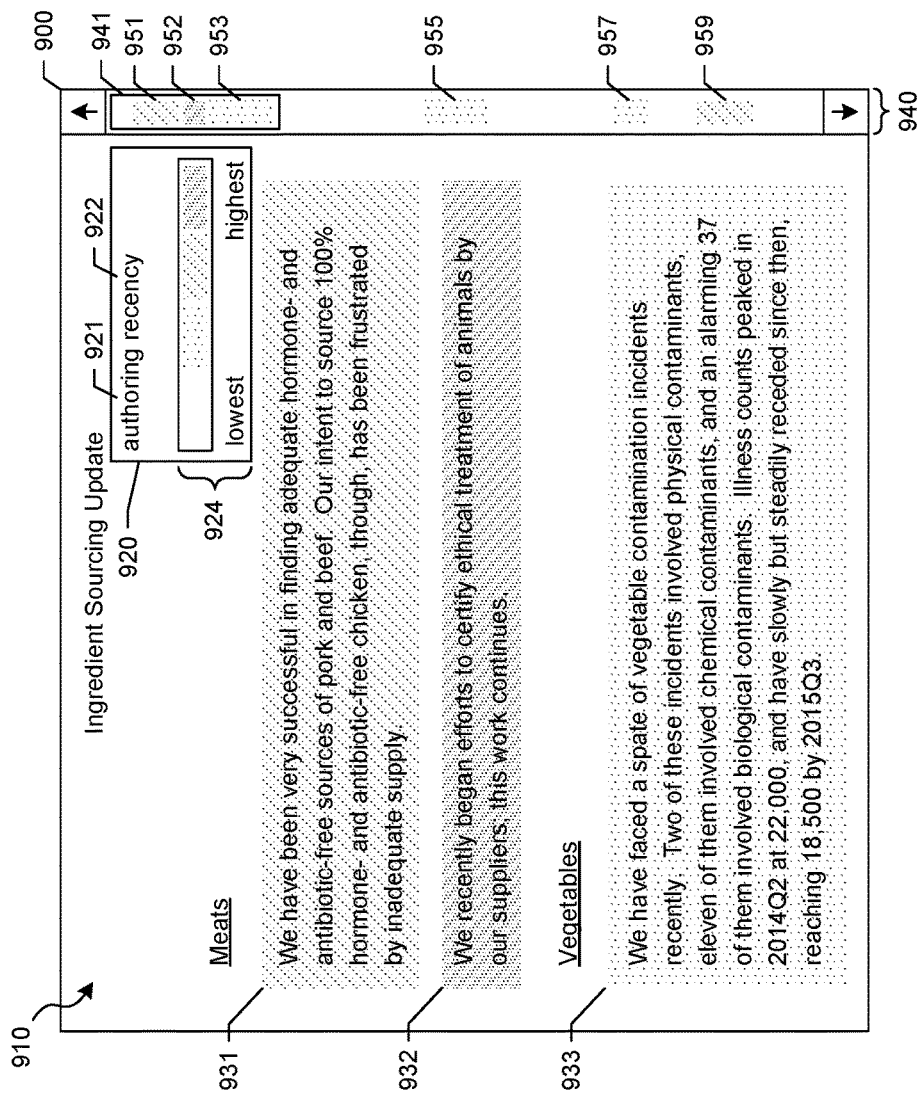
FIG. 9 is a display diagram showing a sample display presented by the facility in some embodiments including second annotations of a sample document in accordance with the user selections shown in FIG. 8.

FIG. 9 is a display diagram showing a sample display presented by the facility in some embodiments including second annotations of a sample document in accordance with the user selections shown in FIG. 8. The display 900 includes a visual representation 910 of the document. The display also includes an annotation legend 920 including details of the annotations, including the activity type 921 that is annotated (authoring), the aggregation type 922 that is applied (recency), and a key 924 to the visual characterizations of degree reflected by the annotations.

The facility has attached an in-content annotation 931 to the first paragraph of the document that reflects that, over the life of the document, this paragraph has been authored or edited at an intermediate level of recency. The facility has attached an in-content annotation 932 to the second paragraph of the document that reflects that this paragraph has been authored or edited at a high level of recency, i.e., relatively recently. The facility has attached an in-content annotation 933 to the third paragraph of the document that reflects that this paragraph has been authored or edited at a low level of recency, i.e., relatively long ago. In a manner similar to FIG. 7, the facility has also added annotations 951-959 to the scrollbar 940 that correspond to the added in-content annotations.

FIG. 10 is a display diagram showing a sample display presented by the facility in some embodiments to permit a user to select aspects of annotation to be performed by the facility, and its use to specify aspects of third annotations of a sample document. It can be seen that, for these third annotations of the sample document, in display 1000, the user has operated controls 1013 and 1014 to select the reading and commenting activities; and that the user has operated control 1232 to select the frequency aggregation type.

Figure 11:
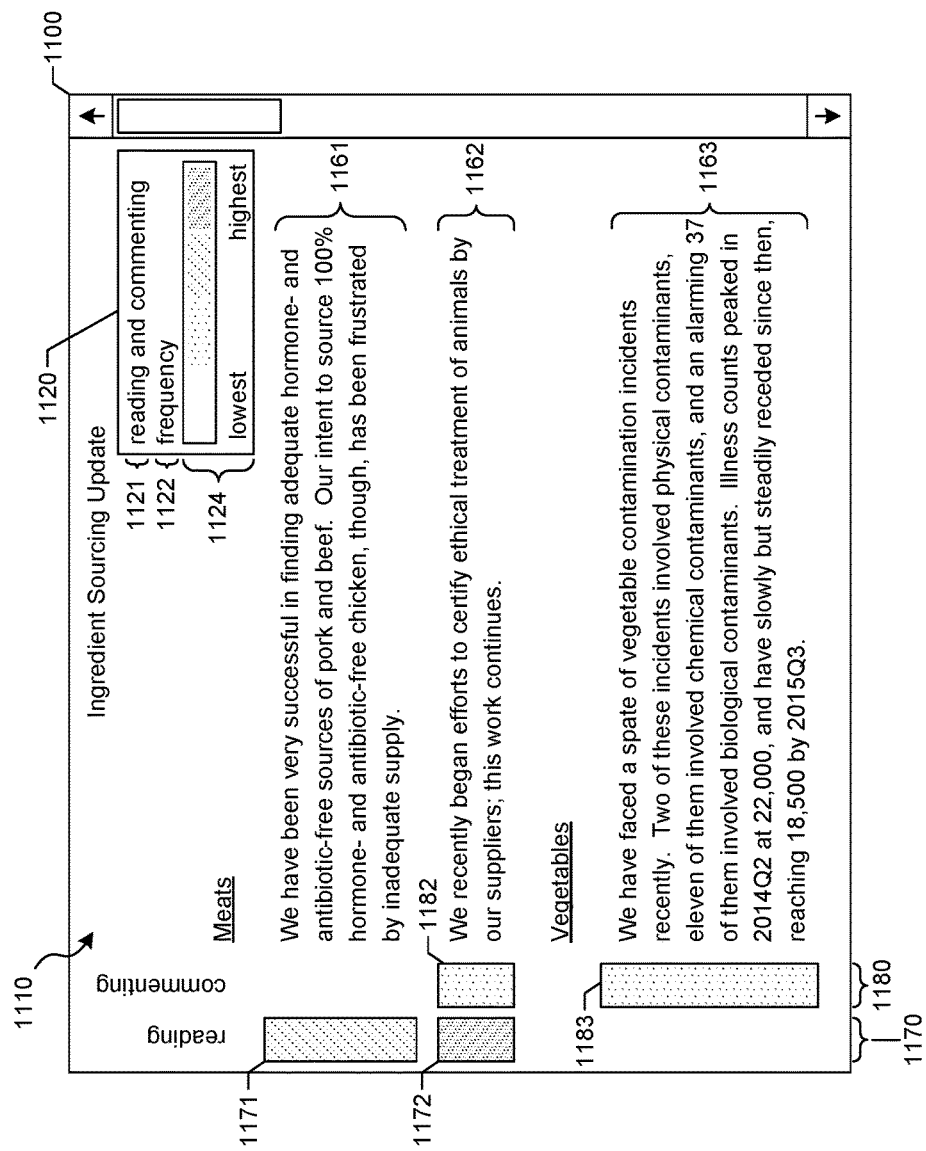
FIG. 11 is a display diagram showing a sample display presented by the facility in some embodiments including third annotations of a sample document in accordance with the user selections shown in FIG. 10.

FIG. 11 is a display diagram showing a sample display presented by the facility in some embodiments including third annotations of a sample document in accordance with the user selections shown in FIG. 10. The display 1100 includes a visual representation 1110 of the document. The display also includes an annotation legend 1120 including details of the annotations, including the activity types 1121 that are annotated (reading and commenting), the aggregation type 1122 that is applied (frequency), and a key 1124 to the visual characterizations of degree reflected by the annotations.

The facility has attached margin annotations that distinguish between the reading and commenting activities, that are applied at a paragraph granularity level. In particular, in column 1170, the facility has attached margin annotations for the reading activity, while in column 1180, the facility has attached margin annotations for the commenting activity. It can be seen from these margin annotations that the first paragraph 1161 has been read at an intermediate frequency, and commented upon at a low frequency; that the second paragraph 1162 has been read at a high frequency, and commented on at an intermediate frequency; and that the third paragraph 1163 has been read at a low frequency, and commented upon at an intermediate frequency. In some embodiments, the facility recognizes a "reading drop-off point" occurring between the second and third paragraphs—where many people read a document from the beginning, but stop reading the document before the end. In some embodiments (not shown), the facility displays an annotation identifying drop-off points that it detects, such as by, for example, including a red horizontal line between the second and third paragraphs, adding a box containing the text "drop-off point" near a point between the second and third paragraphs having an arrow pointing to the space between the second and third paragraphs, or the top of the third paragraph, etc. While FIG. 11 does not show scrollbar annotations corresponding to the shown column annotations, in some embodiments, the facility includes scrollbar annotations in similar situations, such as by including multiple columns of scrollbar annotations in the scrollbar, including in the scrollbar a single column of scrollbar annotations that merges the reading and commenting activities, etc.

FIG. 12 is a display diagram showing a sample display presented by the facility in some embodiments to permit a user to select aspects of annotation to be performed by the facility, and its use to specify aspects of fourth annotations of a sample document. It can be seen that, for these fourth annotations of the sample document, in display 1200, like the third annotation of the sample document specified as shown in FIG. 10, the user has operated controls 1213 and 1214 to select the reading and commenting activities; and that the user has operated control 1232 to select the frequency aggregation type. For the first time for the fourth annotations, the user has operated controls 1242 and 1243 to add the following actors to actor list 1241: a sales group, a marketing group, and a safety group.

Figure 13:
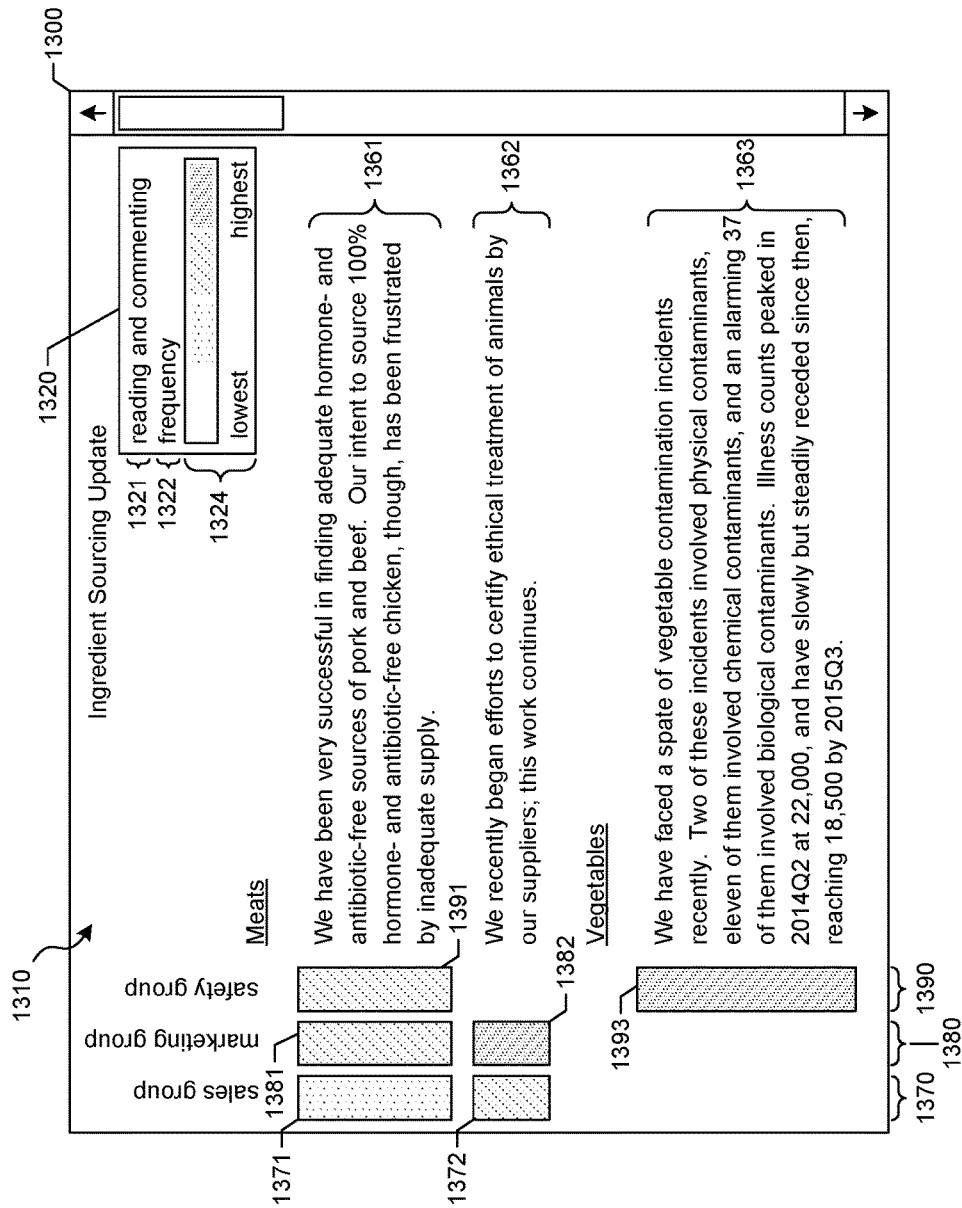
FIG. 13 is a display diagram showing a sample display presented by the facility in some embodiments including fourth annotations of a sample document in accordance with the user selections shown in FIG. 12.

FIG. 13 is a display diagram showing a sample display presented by the facility in some embodiments including fourth annotations of a sample document in accordance with the user selections shown in FIG. 12. The display 1300 includes a visual representation 1310 of the document. The display also includes an annotation legend 1320 including details of the annotations, including the activity types 1321 that are annotated (reading and commenting), the aggregation type 1322 that is applied (frequency), and a key 1324 to the visual characterizations of degree reflected by the annotations.

The facility has attached margin annotations that distinguish between sales, marketing, and safety groups of users, and that merge the reading and commenting activities. In particular, in column 1370, the facility has attached margin annotations for the sales group, while in column 1380, the facility has attached margin annotations for the marketing group, and in column 1390, the facility has attached margin annotations for the safety group. It can be seen from these margin annotations that the first paragraph has been read and commented upon at intermediate frequencies by all three of the groups; that the second paragraph has been read and commented on at intermediate frequencies by the sales and marketing groups, and at a low frequency by the safety group; and that the third paragraph has been read and commented upon at a low frequency by the sales and marketing groups, and at a high frequency by the safety group.

In some embodiments, the facility provides a computing system, comprising: a processor; and a memory having contents that, when executed by the processor: generate a visual representation of at least part of a document; and, for each of one or more portions of the document each represented in the generated visual representation: determine an aggregation of document activities performed with respect to the portion of the document by at least one user, and cause to be included in the generated visual representation, at a location proximate to a portion of the generated visual representation corresponding to the portion of the document, an annotation that reflects the determined aggregation.

In some embodiments, the facility provides a method, comprising: generating a visual representation of at least part of a document; and, for each of one or more portions of the document each represented in the generated visual representation: determining an aggregation of document activities performed with respect to the portion of the document by at least one user, and causing to be included in the generated visual representation, at a location proximate to a portion of the generated visual representation corresponding to the portion of the document, an annotation that reflects the determined aggregation.

In some embodiments, the facility provides a computer-readable medium having contents configured to cause a computing system to: generate a visual representation of at least part of a document; and, for each of one or more portions of the document each represented in the generated visual representation: determine an aggregation of document activities performed with respect to the portion of the document by at least one user, and cause to be included in the generated visual representation, at a location proximate to a portion of the generated visual representation corresponding to the portion of the document, an annotation that reflects the determined aggregation.

In some embodiments, the facility provides a memory having contents configured to cause a computing system to: retrieve contents of a document; use the retrieved contents to specify a visual representation of at least part of the document; and for each of at least two portions of the document that are not identical and that are represented in the specified visual representation, attaching to locations in the document's visual representation corresponding to the portion a visual annotation reflecting an aggregation operation against document activities performed with respect to the portion.

In some embodiments, the facility provides a method, comprising: retrieving contents of a document; using the retrieved contents to specify a visual representation of at least part of the document; and for each of at least two portions of the document that are not identical and that are represented in the specified visual representation, attaching to locations in the document's visual representation corresponding to the portion a visual annotation reflecting an aggregation operation against document activities performed with respect to the portion.

In some embodiments, the facility provides a method in a computing system, the method comprising: retrieving contents of a document; using the retrieved contents to cause to be displayed a visual representation of at least part of the document; and for each of at least two portions of the document that are not identical and that are represented in the displayed visual representation, causing to be displayed in connection with locations in the document's visual representation corresponding to the portion a visual annotation to the document's visual representation reflecting an aggregation operation against document activities performed with respect to the portion.

In some embodiments, the facility provides a computer-readable medium having contents configured to cause a computing system to: retrieve contents of a document; use the retrieved contents to cause to be displayed a visual representation of at least part of the document; and for each of at least two portions of the document that are not identical and that are represented in the displayed visual representation, cause to be displayed in connection with locations in the document's visual representation corresponding to the portion a visual annotation to the document's visual representation reflecting an aggregation operation against document activities performed with respect to the portion.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computing system, comprising:
 a processor; and
 a memory having instructions that, when executed by the processor:
  detect an activity performed with respect to a portion of a displayed electronic document;
  record details of the activity in a data structure, the details including a type of the activity and an identifier of the portion of the electronic document;
  generate and present a user interface including a first selection mechanism for receiving a selected activity type from a plurality of activity types from a user, a second selection mechanism for receiving a selected aggregation type from a plurality of aggregation types from the user, and a third selection mechanism for receiving a selected group of users from the user; and in response to receiving the selected activity type from the user via the first selection mechanism, receiving the selected aggregation type from the user via the second selection mechanism, and receiving the selected group of users from the user via the third selection mechanism automatically select a level of granularity from a plurality of levels for the selected aggregation type based on a factor of the electronic document, the plurality of levels including at least one selected from a group consisting of a character level, a word level, a line level, a paragraph level, and a document section level;

retrieve a set of details from the data structure based on the selected activity type for each of a plurality of portions of the electronic document and the selected group of users;

for each of the plurality of portions of the electronic document, aggregate the set of details to generate a value of the selected aggregation type at the level of granularity for the selected group of users, the value including at least one selected from a group consisting of a frequency of the selected activity type at the level of granularity, a count of the selected activity type at the level of granularity, and a recency of the selected activity type at the level of granularity; and visually mark each of the plurality of portions of the electronic document within a generated visual representation of the electronic document based on the value of the selected aggregation type at the level of granularity for each of the plurality of portions of the electronic document, wherein two of the plurality of portions of the electronic document with different values of the selected aggregation type are visually marked differently.

2. The computing system of claim 1 wherein visually marking each of the plurality of portions of the electronic document includes visually marking content included in the electronic document.

3. The computing system of claim 2 wherein visually marking each of the plurality of portions of the electronic documents at least one selected from a group consisting of imposing a visual characterization upon the content included in the electronic document and imposing a visual characterization on background behind the content included in the electronic document.

4. The computing system of claim 1 wherein visually marking each of the plurality of portions of the electronic document includes visually marking a margin of the electronic document.

5. The computing system of claim 1 wherein visually marking each of the plurality of portions of the electronic document includes visually marking a scrollbar usable to reposition the visual representation for display.

6. The computing system of claim 1 wherein the factor of the electronic document includes at least one selected from a group consisting of a size of the electronic document, an area in which the visual representation is displayed, a zoom level at which the visual representation is displayed, and a scroll position of the visual representation.

7. A non-transitory memory having instructions configured to, when executed by a processor, cause a computing system to:

detect an activity performed with respect to a portion of a displayed electronic document;

record details of the activity in a data structure, the details including a type of the activity and an identifier of the portion of the electronic document;

retrieve contents of the electronic document;

use the retrieved contents to specify a visual representation of at least part of the electronic document;

generate and present a user interface including a first selection mechanism for receiving a selected activity type from a plurality of activity types from a user, a second selection mechanism for receiving a selected aggregation type from a plurality of aggregation types from the user, and a third selection mechanism for receiving a selected group of users form the user; and in response to receiving the selected activity type from the user via the first selection mechanism, receiving the selected aggregation type from the user via the second selection mechanism, and receiving the selected group of users from the user via the third selection mechanism, for each of at least two portions of the electronic document that are not identical and that are represented in the specified visual representation, automatically select a level of granularity from a plurality of levels for the selected aggregation type based on a factor of the electronic document, the plurality of levels including at least one selected from a group consisting of a character level, a word level, a line level, a paragraph level, and a document section level, retrieve a set of details recoded in the data structure based on the selected activity type and the selected group of users, aggregate the set of details to generate a value of the selected aggregation type at the level of granularity for the selected group of users, the value including at least one selected from a group consisting of a frequency of the selected activity type at the level of granularity with respect to the portion, a count of the selected activity type at the level of granularity with respect to the portion, and a recency of the selected activity type at the level of granularity with respect to the portion, and visually mark each of the at least two portions of the electronic document within the visual representation based on the value of the selected aggregation type at the level of granularity for each of the at least two portions of the electronic document, wherein two of the at least two portions of the electronic document with different values of the selected aggregation type are visually marked differently.

8. The memory of claim 7 wherein the selected activity type includes at least one selected from a group consisting of authoring and editing.

9. The memory of claim 7 wherein the selected activity type includes at least one selected from a group consisting of viewing, reading, and commenting.

10. The memory of claim 7 wherein the selected activity type includes at least one selected from a group consisting of citation and bodily incorporation in other documents.

11. The memory of claim 7 wherein the selected activity type includes at least one selected from a group consisting of setting a completion state, setting a business impact level, setting a sensitivity level, and setting security restrictions.

12. The memory of claim 7 wherein the selected activity type includes occurrence of security events.

13. The memory of claim 7 wherein the factor of the electronic document includes at least one selected from a group consisting of a size of the electronic document, an area in which the visual representation is displayed, a zoom level at which the visual representation is displayed, and a scroll position of the visual representation.

14. A method in a computing system, the method comprising:
   detecting an activity performed with respect to a portion of a displayed electronic document;
   recording details of the activity in a data structure, the details including a type of the activity and an identifier of the portion of the electronic document;
   retrieving contents of the electronic document;
   using the retrieved contents to cause to be displayed a visual representation of at least part of the electronic document;
   generating and presenting a user interface including a first selection mechanism for receiving a selected activity type from a plurality of activity types from a user, a second selection mechanism for receiving a selected aggregation type from a plurality of aggregation types from the user, and a third selection mechanism for receiving a selected group of users from the user; and
   in response to receiving the selected activity type from the user via the first selection mechanism, receiving the selected aggregation type from the user via the second selection mechanism, and receiving the selected group of users from the user via the third selection mechanism, for each of at least two portions of the electronic document that are not identical and that are represented in the displayed visual representation,
      automatically, with the processing unit, selecting a level of granularity from a plurality of levels for the selected aggregation type based on a factor of the electronic document, the plurality of levels including at least one selected from a group consisting of a character level, a word level, a line level, a paragraph level, and a document section level,
      retrieving, with the processing unit, a set of details recoded in the data structure based on the selected activity type and the selected group of users,
      aggregating, with the processing unit, the set of details to generate a value of the selected aggregation type at the level of granularity for the selected group of users, the value including at least one selected from a group consisting of a frequency of the selected activity type at the level of granularity with respect to the portion, a count of the selected activity type at the level of granularity with respect to the portion, and a recency of the selected activity type at the level of granularity with respect to the portion, and
      visually marking each of the at least two portions of the electronic document within the visual representation of the electronic document based on the value, wherein at least two of the at least two portions of the electronic document with different values of the selected aggregation type are visually marked differently.

15. The method of claim 14, further comprising receiving a selected period of time from the user via a fourth selection mechanism included in the user interface and wherein aggregating the set of details to generate the vale includes aggregating the set of details to generate the value for the selected period of time, wherein the selected period of time represents a subrange of the electronic document's lifetime.

16. The method of claim 14 wherein automatically selecting the level of granularity based on the factor of the electronic document includes automatically selecting the level of granularity based on at least one selected from a group consisting of a size of the electronic document, an area in which the visual representation is displayed, a zoom level at which the visual representation is displayed, and a scroll position of the visual representation.

* * * * *